Patented Dec. 30, 1941

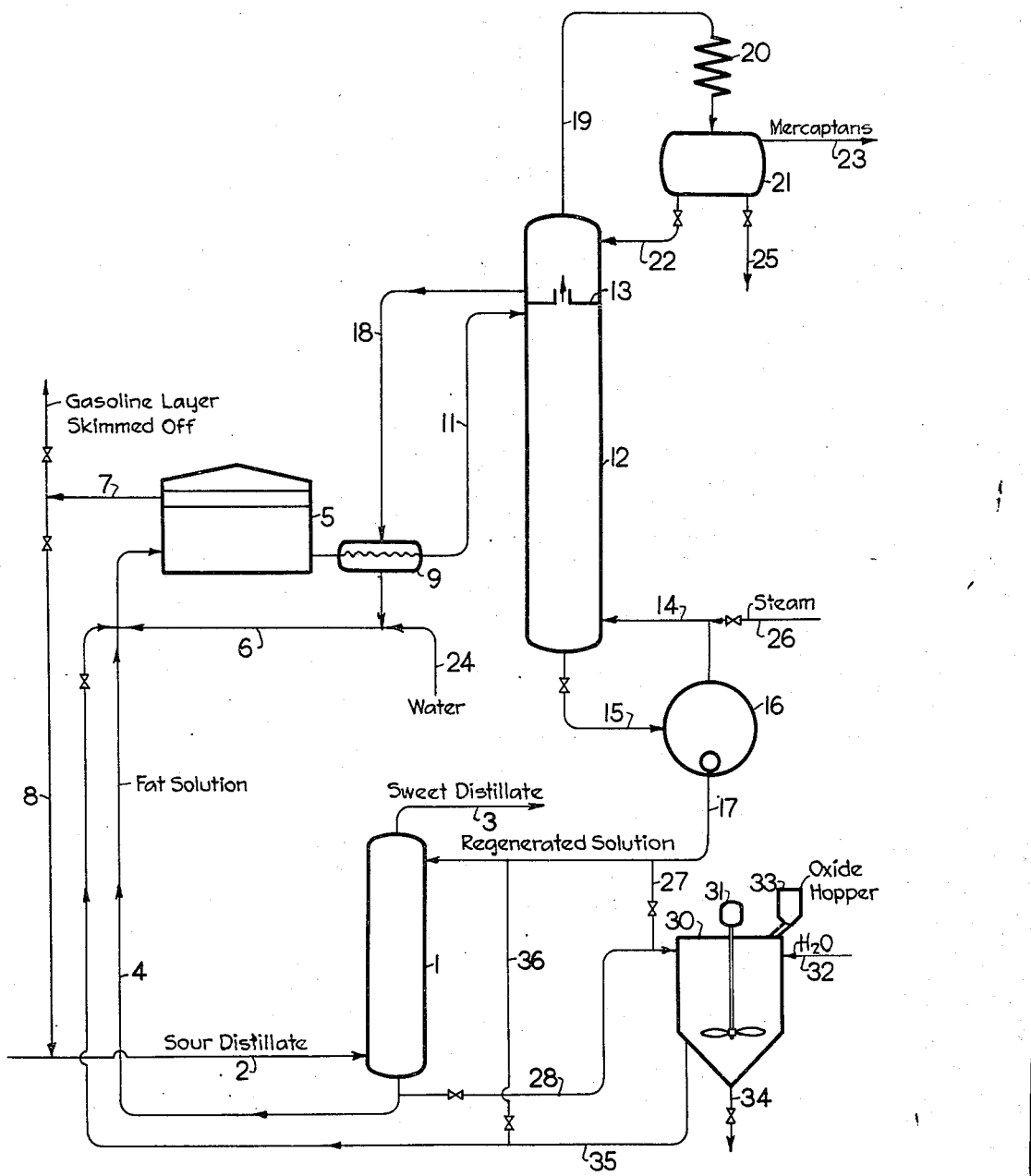

2,267,809

UNITED STATES PATENT OFFICE 2,267,809

PROCESS FOR PURIFYING AQUEOUS SOLUTIONS OF CAUSTIC ALKALI CONTAINING DISSOLVED SULPHIDES

Lawson E. Border, Wood River, Ill., assignor to Shell Development Company, San Francisco, Calif., a corporation of Delaware Application November 24, 1939, Serial No. 305,934

10 Claims. (Cl. 196—32)

This invention relates to a method for purifying aqueous solutions of caustic alkali employed in regenerative extraction processes for the removal of mercaptans from hydrocarbon oils.

It is known that mercaptans can be removed from sour hydrocarbon oils, and the sour oils can be sweetened by extraction with aqueous solutions of alkali metal hydroxides, particularly if the latter contain so-called solutizers for mercaptans whose function is to raise the solvent power of the aqueous solution for the mercaptans. The resulting spent aqueous alkali metal hydroxide solutions containing absorbed mercaptans, principally in the form of mercaptides, may then be regenerated by steam stripping, and be recirculated.

In order to prevent the gradual neutralization of the circulating caustic alkali solution with acids not removable by steam stripping, it is, however, necessary to remove from the sour hydrocarbon oils by suitable pretreatment all acids having dissociation constants greater than about $10^{-9}$, in particular, thiophenols, $H_2S$ and carboxylic acids.

I have now found that in spite of thorough preremoval of all the acids which cannot be removed from aqueous caustic alkali solutions by steam stripping, i. e. those having dissociation constants greater than about $10^{-9}$, the continuously circulating aqueous solution of alkali metal hydroxide may slowly accumulate sulphide and carbonate ions at the expense of the free alkali metal hydroxide. The sulphides may possibly have their origin in a slow decomposition of some of the mercaptans during steam regeneration, while $CO_2$ is probably introduced with the stripping steam. Of these two ions, the sulphide is by far the more harmful, as it may be the cause of some corrosion to iron and certain other metals, particularly in the reboiling sections of the steam stripper. Iron sulphide formed thereby tends to be carried as a fine suspension in the aqueous solution, often causing severe emulsion troubles in the hydrocarbon extraction stages.

It is the purpose of this invention to improve such circulating aqueous solutions of alkali metal hydroxides containing accumulated harmful sulphide ions. More particularly, it is a purpose to remove in a simple manner potentially harmful sulphide ions from such aqueous solutions and to regenerate an equivalent amount of alkali metal hydroxide without imparting to the solutions other harmful properties.

My improvement comprises treating a circulating aqueous alkaline solution used in a regenerative process for extracting mercaptans from sour hydrocarbon oils with an oxide or hydroxide of a metal whose sulphide is insoluble in water, and, more particularly, in the aqueous solution. Sulphide ions in the aqueous solution are precipitated as insoluble sulphides which may be removed in any desirable manner, as by settling, filtration, etc. In a preferred modification of my process, I treat the solution containing dissolved sulphides with an amount of the heavy metal oxide or hydroxide insufficient to precipitate all of the sulphide ions, as I have found that in this manner none of the relatively expensive heavy metal reagent is wasted, and that, moreover, relatively small amounts of dissolved sulphides are quite harmless and do not cause corrosion even under unfavorable conditions. Precipitation of a portion only has the added advantage that it precludes the possibility of forming water-soluble heavy metal compounds, which in turn might be dissolved in the hydrocarbon oil, thereby rendering it unstable. The aqueous solution, in addition to containing sulphides, also contains mercaptides and usually one or several solutizers. Many of the heavy metal oxides which form water-insoluble sulphides tend to form water-soluble complex compounds or soluble mercaptides, while others like lead oxide form water-soluble alkali metal salts. By retaining in the aqueous solution at least a small amount of residual sulphides, the dissolution of heavy metal ions is effectively prevented.

Suitable metal oxides are those of the heavy metals Cu, Ag, Zn, Cd, Hg, Sn, Pb, Fe, Ni, Co and Cr. Copper and lead oxides, and more particularly, $Cu_2O$, are preferred.

The reaction which takes place in contact with $Cu_2O$ is shown in the equation below:

$$K_2S + Cu_2O + H_2O \rightarrow Cu_2S + 2KOH$$

The use of the free heavy metals or salts thereof for my purpose is not desirable. Metals act slowly, and often form very finely divided sulphides which tend to be carried by the aqueous solution, thereby giving rise to emulsion troubles. Moreover, in addition, a portion of sulphide ions is converted to thiosulphate ions, so that the regeneration of alkali metal hydroxide, effected by the precipitation of the sulphide ions remains incomplete.

Likewise, the use of heavy metal salts fails to result in the regeneration of free alkali metal hydroxide, and that is undesirable.

The method of contacting the solution with the metal oxide or hydroxide is not critical, and any method enabling the precipitation of the sulphide ions and separation of the precipitated insoluble sulphides, as by settling, filtering, etc., will do. The contacting may be continuous or batchwise, and may be resorted to whenever the sulphide content has built up to a concentration which under the particular treating conditions may prove unfavorable, or which ties up an amount of free alkali metal hydroxide sufficient seriously to interfere with the extraction capacity for mercaptans of the aqueous extracting solution. Moreover, it is immaterial whether the spent or regenerated aqueous solution is contacted with the heavy metal reagent, i. e., whether or not the solution is laden with mercaptans. If it is desired to retain the residual amount of sulphide ions in the aqueous solution, such amount should obviously be insufficient to cause potential corrosion to any part of the treating equipment.

The maximum desirable amount of residual sulphide ions cannot be stated accurately. Any amount smaller than the original represents, of course, an improvement, and the lowest amount which can conveniently be obtained without waste of heavy metal oxide and without formation of dissolved heavy metal ions is the most desirable. As far as corrosion is concerned, the tolerance for sulphide ions varies between extremely wide limits, depending upon the metals used in the construction of the equipment and the conditions of the extraction process. In general, it is desirable, as well as easily possible, to reduce the normality of the residual sulphide ions to below about .5, and preferably to below about .1 without using an excess of heavy metal oxide over the theoretical.

Depending on the method of contact employed for precipitating the sulphide ions, different means may be useful to enable the maintenance of the residual sulphide ion content. For example, the metal oxide or hydroxide reagent may be fed continuously or intermittently in the dry form or as a slurry to the aqueous solution, whereupon the mixture is agitated thoroughly. In this case, the amount of the reagent fed may be slightly less than the stoichiometric quantity required to precipitate all of the sulphide ions. Or else an excess of the reagent may be fed and the agitation may be stopped at a time before all of the sulphide ions have been precipitated. If desired, the aqueous solution may be filtered through a bed of a suitable metal oxide or hydroxide until the reagent is exhausted. If desired, the aqueous solution may be divided into two unequal portions, all of the sulphides are precipitated, if necessary, with an excess of the reagent from the larger portion, precipitated sulphide and excess metal oxides are separated, and the resulting treated portion is then combined with the untreated smaller portion. The ratio of the two portions should preferably be such as to allow for an excess of dissolved sulphide ions over any metal reagent which may have become dissolved in the larger portion.

My process is illustrated in the attached drawing which represents a simplified flow diagram of a preferred form of my process.

A sour gasoline distillate is introduced from a source not shown into extractor 1 through line 2, and is sweetened by extraction with an aqueous solution of a caustic alkali containing sufficient solutizer to enable the desired sweetening to take place. Sweet distillate emerges through line 3 and fat aqueous solution containing absorbed mercaptans and hydrocarbons passes through bottom line 4 to surge or settling tank 5 or part or all of the fat solution is diverted through line 28 to tank 30 to be treated in a manner hereinafter described. Water recovered from the stripping operation is added from line 6 to the fat solution in line 4. Aqueous caustic alkali solution, freed of sulphides in a manner presently to be described, is added from line 35 to the fat solution in line 4. Immediately upon dilution, the fat solution releases a portion of its dissolved hydrocarbons, which in tank 5 is allowed to rise to the top and is withdrawn through line 7. If desired, the separated oil may be returned through line 8 to the sour distillate entering extractor 1.

The resulting lean solution, which still contains substantially all of the absorbed mercaptans, passes from tank 5 through heat exchanger 9 in line 11, and the resulting hot solution enters steam stripper 12 at a point immediately below tray 13. Tray 13 divides the stripper 12 into an upper smaller reflux section and a lower large stripping section. The hot lean solution flows down through the stripper section in counter-current to stripping steam which enters the stripper near its bottom through line 14. The stripper lean solution then passes from the stripper 12 through line 15 to reboiler 16, where the water of dilution, which had been added to the fat solution in line 4, is vaporized, and steam so produced is used for stripping, returning to the steam stripper through line 14. Regenerated and reconcentrated caustic alkali solution returns to the top of extractor 1 through line 17 to sweeten further amounts of sour distillate, or part or all of the regenerated solution is diverted through line 27 into line 28 and thence into tank 30.

The caustic alkali solutions containing sulphides which are to be removed enter tank 30 near its top. The heavy metal oxides are dropped into the solution in tank 30 from hopper 33 and the dilute slurry thoroughly agitated by stirrer 31. Water for diluting the solutions in tank 30 is added through line 32. Precipitated metal sulphides are removed through line 34. Sulphide-free fat solutions are returned to the system through aforementioned line 35. Sulphide-free lean solutions are returned to the extractor through line 35 to line 36 and thence into line 17.

The steam in stripper 12 rises through plate 13 into the upper reflux section in which a portion of the small amount of residual dissolved hydrocarbons, which have remained in the lean solution after dilution and which are expelled in the stripper, may be condensed and returned to tank 5 together with the water of dilution, through lines 18 and 6 and heat exchanger 9.

The small amount of mercaptans dissolved in the reflux added through line 22 to stripper 12 are steamed out in the reflux section (about plate 13) and the water of dilution flowing through line 18 is thus substantially free of mercaptan. This reflux also serves as a spray catcher.

The remaining vapors emerge from the reflux section of stripper 12 through line 19 and are condensed in condenser 20. The resulting condensate flows into receiving tank 21, where two liquid layers are formed, an upper relatively pure mercaptan layer which is withdrawn through line 23, and a lower water layer, containing small amounts of mercaptans, which layer is returned through line 22 to the stripping sections where it serves as reflux.

In a system which is not completely closed, i. e. in which water for dilution may be introduced into line 6 and tank 5 from an outside source through line 24, in which further excessive water of condensation in tank 21 may be disposed of through line 25 and in which steam for stripping may be introduced from an outside source through line 26, the water of dilution may not exceed that which is removed by evaporation in the reboiler 16, otherwise the circulating solution would become more and more diluted and incapable of sweetening a sour distillate.

The following example further illustrates my invention. An aqueous KOH solution used for extracting mercaptans from a sour gasoline in a system comprising an extractor and steam stripper causing some slight corrosion contained .95 gram mol. liter dissolved sulphide ions. Besides KOH and sulphide, the solution contained potassium isobutyrate, alkyl phenolates, mercaptides, and carbonate. This solution was treated for 15 minutes at 65° C. with an amount of $Cu_2O$ equal to about 90% of the stoichiometric amount required to precipitate all of the sulphide ions. The compositions of the solution before and after the treatment were as follows:

|  | Normalities— | |
|---|---|---|
|  | Before | After |
| Mercaptan sulphur | .30 | .30 |
| Sulphide sulphur | .95 | .02 |
| Phenolate | .65 | .65 |
| Carbonate | .62 | .62 |
| Isobutyrate | 2.30 | 2.30 |
| Free KOH | 2.48 | 3.38 |
| Total | 7.30 | 7.27 |

The treated solution was non-corrosive.

I claim as my invention:

1. In a regenerative process wherein mercaptans are extracted from hydrocarbon distillates substantially free from $H_2S$ with an aqueous solution of an alkaline metal hydroxide and wherein the resulting spent solution containing mercaptides is regenerated by steam stripping and is returned for further extraction, said solution having accumulated dissolved sulphide ions, the improvement comprising contacting said aqueous solution with a quantity of a reagent selected from the group consisting of the oxides and hydroxides of copper, silver, zinc, cadmium, mercury, tin, lead, iron, nickel, cobalt and chromium, under conditions to convert said sulphide ions to insoluble metal sulphides.

2. The process of claim 1 in which the quantity of the reagent is less than the stoichiometric amount required to precipitate all the dissolved sulphide ions.

3. The process of claim 1 in which the quantity of the reagent is in excess of the stoichiometric amount required to precipitate all of the dissolved sulphide ions, and the time of contact is insufficient to complete the precipitation of all sulphide ions.

4. The process of claim 1 in which the agent is $Cu_2O$.

5. The process of claim 1 in which the solution is contacted with $Cu_2O$ in an amount about 90% of the stoichiometric amount required to precipitate all the dissolved sulphide ions.

6. In a regenerative process wherein mercaptans are extracted from hydrocarbon distillates substantially free from $H_2S$ with an aqueous solution of an alkaline metal hydroxide and wherein the resulting spent solution containing mercaptides is regenerated by steam stripping and is returned for further extraction, said solution having accumulated dissolved sulphide ions, the improvement comprising contacting said aqueous solution with a quantity of a reagent selected from the group consisting of the oxides and hydroxides of copper, silver, zinc, cadmium, mercury, tin, lead, iron, nickel, cobalt and chromium, under conditions to convert said sulphide ions to insoluble metal sulphides.

7. In a regenerative process wherein mercaptans are extracted from hydrocarbon distillates substantially free from $H_2S$ with an aqueous solution of an alkaline metal hydroxide and wherein the resulting spent solution containing mercaptides is regenerated by steam stripping and is returned for further extraction, said solution having accumulated dissolved sulphide ions, the improvement comprising contacting said solution with a reagent selected from the group consisting of the oxides and hydroxides of copper, silver, zinc, cadmium, mercury, tin, lead, iron, nickel, cobalt and chromium, under conditions to precipitate a portion only of said dissolved sulphide ions and to produce a precipitated metal sulphide and a contacted solution containing a residual amount of sulphide ions, and separating said precipitated sulphide from the treated solution, said residual amount being insufficient to cause substantial corrosion in said regenerative process.

8. The process of claim 7 in which said residual sulphide ions have a normality below .5.

9. The process of claim 7 in which said residual sulphide ions have a normality below .1.

10. In a regenerative process wherein mercaptans are extracted from hydrocarbon distillates substantially free from $H_2S$ with an aqueous solution of an alkaline metal hydroxide and wherein the resulting spent solution containing mercaptides is regenerated by steam stripping and is returned for further extraction, said solution having accumulated dissolved sulphide ions, the improvement comprising dividing said aqueous solution into two unequal portions, contacting the larger portion with a reagent selected from the group consisting of the oxides and hydroxides of copper, silver, zinc, cadmium, mercury, tin, lead, iron, nickel, cobalt and chromium, under conditions to precipitate all of the sulphide ions and to produce precipitated metal sulphide and a treated portion containing in solution some of the metal oxide, separating the treated portion from the precipitated metal sulphides, and combining the smaller untreated portion with the resulting treated portion, the ratio of the two portions being such that the sulphide content of the smaller portion is in excess of the equivalent of the dissolved metal reagent contained in the treated larger portion.

LAWSON E. BORDER.